Patented Apr. 4, 1944

2,346,012

UNITED STATES PATENT OFFICE 2,346,012

MANUFACTURE OF CATALYSTS

Joseph D. Danforth, Chicago, Ill., assignor to Universal Oil Products Company, Chicago, Ill., a corporation of Delaware No Drawing. Application May 9, 1942, Serial No. 442,369

21 Claims. (Cl. 252—228.7)

This invention relates to the manufacture of composite catalysts useful in hydrocarbon conversion reactions and it is more particularly directed to improved methods in the manufacture of such catalysts.

The art of hydrocarbon conversions such as, for example, the cracking of relatively heavy petroleum fractions to produce lower-boiling fractions of motor fuel therefrom, has recently undergone rapid changes due to the employment of catalysts of a generally refractory character to accelerate and modify the types of conversion reactions which occur, generally in the direction of improved yields of gasoline and improvements in antiknock value of the gasolines. Other advantages in the use of properly selected catalysts are the ability to employ conditions of lowered intensity in respect to temperature, pressure and time under conversion conditions and the production of lower yields of carbon and highly carbonaceous deposits in many instances.

Some of the types of catalysts which have been successfully employed in this modifying cracking reactions comprise for the most part metal oxides in contrast to metals themselves since the latter have a tendency to foster carbon formation rather than to promote reactions leading to the development of lower boiling hydrocarbons. Thus, fuller's earths and clays both raw and acid-treated have been employed with success as have also synthetic composite oxide catalysts of the silica-alumina type. These types of catalysts have been employed in different processes involving the use of formed catalyst particles in fixed bed operations, in operations in which the powdered catalyst was employed in suspension to make a slurry in a liquid oil, and in the so-called "fluid catalyst" type of operation in which vapors of the oil to be cracked have been passed either concurrently with or counter-currently to relatively high concentrations of the finely divided catalyst in powdered form.

In the manufacture of catalysts of the mixed oxide type such as, for example, the silica-alumina type, difficulties have been encountered because of the need for eliminating alkali metal compounds from the finally prepared composites in cases wherein silica has been produced by the acidification of aqueous solutions of alkali metal silicates or wherein the silica-alumina has been coprecipitated by the addition of salts of aluminum to the alkali metal silicates. When the source of the silica has been an alkali metal silicate, it has been necessary to resort to exhaustive washing of the primarily precipitated silica or the finally prepared silica-alumina composite with water, acids, ammonium salts or multivalent metal salts to remove or displace the alkali metal compounds, which, if left in the catalyst, would render the life of the catalyst short evidently on account of sintering or glazing of the catalyst surface whereby the porosity is decreased and the effectiveness of the contact surface diminished. The present invention produces catalysts by reactions which do not involve alkali metal compounds so that the need for washing is eliminated.

In one specific embodiment the present invention comprises a process for the manufacture of catalysts useful in hydrocarbon conversion reactions which comprises adding heteropoly fluorine acids to specially prepared zirconium oxides.

By thus using the designated acids containing fluorine, catalysts are produced which are free from alkali metal compounds and which contain varying amounts of combined fluorine. Acids which may be used alternatively in the production of the catalysts include hydrofluoboric acid ($HBF_4$), hydrofluosilicic acid ($H_2SiF_6$), hydrofluozirconic acid ($H_2ZrF_6$), hydrofluotitanic acid ($H_2TiF_6$) and hydrofluostannous acid ($H_2SnF_4$). While these acids may be used alternatively they may not produce catalyst composites of exactly equivalent properties or activities.

It has been found essential to the production of good catalysts by the present process to utilize zirconium oxides which have been prepared by controlled calcination of zirconium oxide hydrates at temperatures within the range of from about 300° to about 600° C. While any hydrated zirconium oxide may be prepared by calcination at some temperature in the above range, it is usually preferable to utilize precipitated zirconia hydrates having the general formula, $Zr(OH)_4$ which yield on controlled calcination the oxide, $ZrO_2$. When highly hydrated zirconias such as precipitated gels prepared by adding basic precipitants to solutions of zirconium salts are heated at about 500° C. their water content is usually in correspondence with a zirconia monohydrate.

In preparing catalysts by the present process a hydrated zirconia is first calcined at a temperature of about 500° C. and then mixed with aqueous solutions of such compounds as hydrofluosilicic acid, $H_2SiF_6$; hydrofluoboric acid, $HBF_4$, etc. in amounts of from 1 to 30 per cent and preferably 5 to 25 per cent by weight of the zirconia. The mixtures are then heated for some time at a temperature somewhere within the range of from about 100° to about 300° C. and then for a shorter period of time at a temperature of about 350° C. after which the material may be formed by sizing to produce irregular particles of a given range of sizes or the mixed materials may be powdered and formed into definite shapes by extrusion methods or pelleted and then calcined at a temperature of from about 500° to about 600° C. Any hydrofluoric acid evolved during the final calcination may be recovered and reused by absorbing it in water and allowing it to react for example with silica to form hydrofluosilicic acid or with boric oxide to form fluoboric acid.

As already stated, catalysts of the present character may be employed in different types of hydrocarbon conversion reactions in pilled, briquetted, granular, extruded or powdered form when the conversion process is operated in different ways.

The following data including a summary of results of a test are introduced to indicate the general methods of preparing catalysts according to the present invention and the type of results obtained when they are used in cracking reactions although the data are not introduced with the intention of limiting the scope of the invention in exact accordance therewith.

An ammonium carbonate solution was added to a solution of zirconium oxy-chloride ($ZrOCl_2$) to precipitate zirconia as a hydrated gelatinous precipitate. The precipitate was washed five times by dilute aqueous ammonium hydroxide. The washed product was dried at 110° C., formed into 6-10 mesh granules by grinding and sizing and these were calcined at 500° C. for one hour. One hundred parts by weight of these granules were impregnated with 30 parts by weight of a 15 per cent solution of hydrofluosilicic acid.

($H_2SiF_6$)

after which the impregnated granules were dried and heated at 500° C. for 1 hour.

The catalyst thus prepared was tested as to its activity in catalyzing hydrocarbon cracking reactions by using it in a stationary bed operation for the cracking of a Mid-Continent gas oil at a temperature of 500° C., under substantially atmospheric pressure and at a liquid hourly space velocity of 1. In a single pass through a bed of the pelleted catalysts 20 per cent of 400° F. end-point gasoline was produced having an octane number of 75 by the motor method of testing. By recycling of unconverted fractions the ultimate yield of gasoline was raised to 65%.

I claim as my invention:

1. A catalyst suitable for use in hydrocarbon conversion reactions comprising zirconium oxide and a heteropoly fluorine acid.

2. A process for the manufacture of a catalyst suitable for use in hydrocarbon conversion reactions which comprises heating a hydrated zirconium oxide to a temperature of from about 300 to about 600° C., cooling and mixing said oxide with a solution of a heteropoly fluorine acid and further heating to remove solvent.

3. A process for the manufacture of a catalyst suitable for use in hydrocarbon conversion reactions which comprises heating a hydrated zirconium oxide to a temperature of from about 300 to about 600° C., cooling and mixing said oxide with an aqueous solution of a heteropoly fluorine acid and further heating to remove water.

4. A process for the manufacture of a catalyst suitable for use in hydrocarbon conversion reactions which comprises mixing a zirconium oxide with hydrofluosilicic acid.

5. A process for the manufacture of a catalyst suitable for use in hydrocarbon conversion reactions which comprises mixing a zirconium oxide with hydrofluoboric acid.

6. A process for the manufacture of a catalyst suitable for use in hydrocarbon conversion reactions which comprises mixing a zirconium oxide with hydrofluozirconic acid.

7. A process for the manufacture of a catalyst suitable for use in hydrocarbon conversion reactions which comprises mixing a zirconium oxide with an aqueous solution of a heteropoly fluorine acid and heating to drive off water.

8. A process for the manufacture of a catalyst suitable for use in hydrocarbon conversion reactions which comprises mixing a hydrated zirconium oxide with an aqueous solution of a heteropoly fluorine acid and heating to drive off water.

9. A process for the manufacture of a catalyst suitable for use in hydrocarbon conversion reactions which comprises heating a hydrated zirconium oxide to a temperature of from about 300 to about 600° C., cooling and mixing said oxide with an aqueous solution of hydrofluosilicic acid and further heating to drive off water.

10. A process for the manufacture of a catalyst suitable for use in hydrocarbon conversion reactions which comprises heating a hydrated zirconium oxide to a temperature of from about 300 to about 600° C., cooling and mixing said oxide with an aqueous solution of hydrofluoboric acid and further heating to drive off water.

11. A process for the manufacture of a catalyst suitable for use in hydrocarbon conversion reactions which comprises heating a hydrated zirconium oxide to a temperature of from about 300 to about 600° C., cooling and mixing said oxide with an aqueous solution of hydrofluozirconic acid and further heating to drive off water.

12. A process for the manufacture of a catalyst suitable for use in hydrocarbon conversion reactions which comprises heating a hydrated zirconium oxide to a temperature of from about 300 to about 600° C., cooling and mixing said oxide with an aqueous solution containing hydrofluosilicic acid in an amount equal to from about 5 to about 25 per cent by weight of said zirconium oxide and further heating to drive off water.

13. A process for the manufacture of a catalyst suitable for use in hydrocarbon conversion reactions which comprises heating a hydrated zirconium oxide to a temperature of from about 300 to about 600° C., cooling and mixing said oxide with an aqueous solution containing hydrofluoboric acid in an amount equal to from about 5 to about 25 per cent by weight of said zirconium oxide and further heating to drive off water.

14. A process for the manufacture of a catalyst suitable for use in hydrocarbon conversion reactions which comprises heating a hydrated zirconium oxide to a temperature of from about 300 to about 600° C., cooling and mixing said oxide with an aqueous solution containing hydrofluozirconic acid in an amount equal to from about 5 to about 25 per cent by weight of said zirconium oxide and further heating to drive off water.

15. A process for the manufacture of a catalyst suitable for use in hydrocarbon conversion reactions which comprises calcining a hydrated zirconia at a temperature of from about 300 to about 600° C., treating the calcined zirconia with an aqueous solution of hydrofluosilicic acid containing from about 5 to about 25 per cent by weight of hydrofluosilicic acid calculated on the weight of the zirconia, drying and further heating the product.

16. A process for the manufacture of a catalyst suitable for use in hydrocarbon conversion reactions which comprises calcining a hydrated zirconia at a temperature of from about 300 to about 600° C., treating the calcined zirconia with an aqueous solution of hydrofluoboric acid containing from about 5 to about 25 per cent by weight of hydrofluoboric acid, calculated on the weight of the zirconia, drying and further heating the product.

17. A process for the manufacture of a catalyst suitable for use in hydrocarbon conversion reactions which comprises calcining a hydrated zirconia at a temperature of from about 300 to about 600° C., treating the calcined zirconia with an aqueous solution of hydrofluozirconic acid containing from about 5 to about 25 per cent by weight of hydrofluozirconic acid calculated on the weight of the zirconia, drying and further heating the product.

18. A catalyst suitable for use in hydrocarbon conversion reactions resulting from heating a hydrated zirconium oxide to a temperature of from about 300 to about 600° C., cooling and mixing said oxide with an aqueous solution of hydrofluosilicic acid and further heating to drive off water.

19. A catalyst suitable for use in hydrocarbon conversion reactions resulting from heating a hydrated zirconium oxide to a temperature of from about 300 to about 600° C., cooling and mixing said oxide with an aqueous solution of hydrofluoboric acid and further heating to drive off water.

20. A catalyst suitable for use in hydrocarbon conversion reactions resulting from heating a hydrated zirconium oxide to a temperature of from about 300 to about 600° C., cooling and mixing said oxide with an aqueous solution of hydrofluozirconic acid and further heating to drive off water.

21. A process for producing a catalyst suitable for use in hydrocarbon conversion reactions which comprises impregnating zirconium oxide with a heteropoly fluorine acid and calcining the impregnated zirconium oxide.

JOSEPH D. DANFORTH.